United States Patent
Caldwell

(10) Patent No.: US 11,285,563 B2
(45) Date of Patent: Mar. 29, 2022

(54) FIBER FEEDBACK

(71) Applicant: Branson Ultrasonics Corporation, Danbury, CT (US)

(72) Inventor: Scott Caldwell, New Milford, CT (US)

(73) Assignee: Branson Ultrasonics Corporation, Brookfield, CT (US)

( * ) Notice: Subject to any disclaimer, the term of this patent is extended or adjusted under 35 U.S.C. 154(b) by 441 days.

(21) Appl. No.: 16/146,290

(22) Filed: Sep. 28, 2018

(65) Prior Publication Data

US 2019/0118288 A1    Apr. 25, 2019

Related U.S. Application Data

(60) Provisional application No. 62/574,972, filed on Oct. 20, 2017.

(51) Int. Cl.
*B23K 26/06* (2014.01)
*G01J 1/04* (2006.01)
*G01J 1/42* (2006.01)

(52) U.S. Cl.
CPC ........ *B23K 26/0626* (2013.01); *G01J 1/0425* (2013.01); *G01J 1/4257* (2013.01)

(58) Field of Classification Search
CPC ....... B23K 26/00; B23K 26/20; B23K 26/064
USPC ....... 250/227.11; 219/121.63, 121.83, 121.6; 700/166
See application file for complete search history.

(56) References Cited

U.S. PATENT DOCUMENTS

| 4,611,292 A * | 9/1986 | Ninomiya .............. B25J 19/023 |
| | | 348/94 |
| 5,155,329 A | 10/1992 | Terada et al. |
| 6,528,755 B2 | 3/2003 | Grewell et al. |
| 7,085,296 B2 | 8/2006 | Caldwell |
| 7,343,218 B2 | 3/2008 | Caldwell et al. |
| 8,307,900 B2 | 11/2012 | Lynde et al. |

(Continued)

FOREIGN PATENT DOCUMENTS

| CN | 101069990 A | 11/2007 |
| CN | 105195894 A | 12/2015 |

(Continued)

OTHER PUBLICATIONS

First Office Action regarding Chinese Patent Application No. 201811222878.4, dated Aug. 4, 2021. Translation provided by Unitalen Attorneys at Law.

(Continued)

*Primary Examiner* — Tu B Hoang
*Assistant Examiner* — Thomas J Ward
(74) *Attorney, Agent, or Firm* — Harness, Dickey & Pierce, P.L.C.

(57) ABSTRACT

Sensors comprising optical sensor fibers detect a laser light output from at least a laser delivery optical fiber to provide feedback of the laser light intensity detected by the optical sensor fiber. The optical sensor fibers may be integrated within a laser delivery bundle, or may be positioned between a delivery end of the laser delivery optical fiber and a plurality of work pieces to be welded. In various aspects, the feedback provided from the optical sensor fibers is used to control the laser light intensity or to alert an operator that the laser light intensity has fallen below a predetermined parameter.

4 Claims, 6 Drawing Sheets

(56) References Cited

U.S. PATENT DOCUMENTS

| | | | | |
|---|---|---|---|---|
| 2004/0118996 A1* | 6/2004 | Caldwell | ............... | G01J 1/4257 |
| | | | | 250/227.11 |
| 2007/0265726 A1* | 11/2007 | Caldwell | ................ | B23K 26/04 |
| | | | | 700/166 |
| 2012/0285936 A1 | 11/2012 | Urashima et al. | | |
| 2014/0346330 A1 | 11/2014 | Blomster et al. | | |
| 2015/0338210 A1 | 11/2015 | Lessmuller et al. | | |
| 2017/0038249 A1 | 2/2017 | Fujita et al. | | |
| 2019/0099833 A1 | 4/2019 | Keen | | |

FOREIGN PATENT DOCUMENTS

| | | |
|---|---|---|
| CN | 105277568 A | 1/2016 |
| CN | 106663611 A | 5/2017 |
| CN | 106711750 A | 5/2017 |
| EP | 817697 B1 | 8/2003 |

OTHER PUBLICATIONS

First Office Action regarding Chinese Patent Application No. 201811221409.0, dated Sep. 28, 2021. Translation provided by Unitalen Attorneys at Law.

* cited by examiner

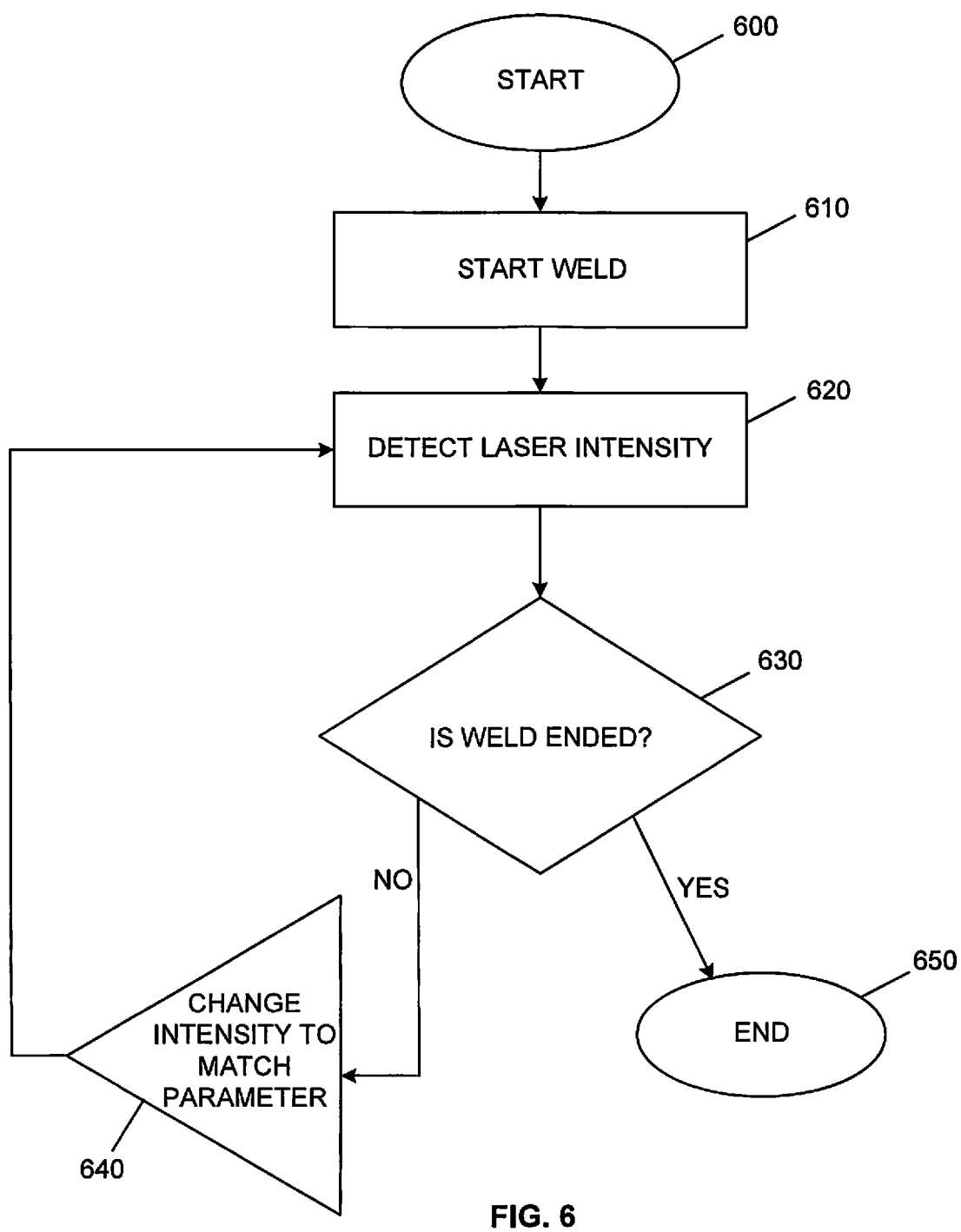

FIBER FEEDBACK

CROSS-REFERENCE TO RELATED APPLICATIONS

This application claims the benefit of U.S. Provisional Application No. 62/574,972, filed on Oct. 20, 2017. The entire disclosure of the above application is incorporated herein by reference.

FIELD

The present disclosure relates to plastics welding and, more particularly, relates to assessing optical fibers in direct delivery welding and simultaneous laser welding applications.

BACKGROUND

This section provides background information related to the present disclosure which is not necessarily prior art.

Laser welding is commonly used to join plastic or resinous parts, such as thermoplastic parts, at a welding zone.

There are many different laser welding technologies. One useful technology is simultaneous through transmissive infrared welding, referred to herein as SSTIr. In SSTIr, the full weld path or area (referred to herein as the weld path) is simultaneously exposed to laser radiation, such as through a coordinated alignment of a plurality of laser light sources, such as laser diodes. An example of SSTIr is described in U.S. Pat. No. 6,528,755 for "Laser Light Guide for Laser Welding," the entire disclosure of which is incorporated herein by reference. In SSTIr, the laser radiation is typically transmitted from one or more laser sources to the parts being welded through one or more optical waveguides which conform to the contours of the parts' surfaces being joined along the weld path. To ensure an accurate and comprehensive weld, the gap between any waveguide and the workpiece closest to the waveguide is kept as small as possible. Correspondingly, to improve efficiency, the gap between the delivery end of the fiber bundle and the waveguide is also kept as small as possible.

SUMMARY

This section provides a general summary of the disclosure, and is not a comprehensive disclosure of its full scope or all of its features.

The present technology provides a method for determining the output of laser light intensity used to weld a plurality of work pieces in a laser welding system. The method includes directing a laser source from a laser bank through a plurality of laser delivery bundles, wherein each of the plurality of laser delivery bundles are comprised of at least a laser delivery optical fiber and the plurality of laser delivery bundles deliver laser light through the at least the laser delivery optical fiber through a wave guide to the plurality of work pieces to be welded. A plurality of optical sensor fibers are positioned such that each optical sensor fiber senses a laser light output by one of the plurality of the laser delivery bundles relating to the intensity output of one of the plurality of laser delivery optical fibers and relays that sensed laser light to a sensor. In other embodiments, the positioning of the plurality of sensors comprises positioning an input end of each of the plurality of optical sensor fibers between the delivery end of the laser delivery bundles and the plurality of work pieces to be welded. In yet other embodiments, at least an optical sensor fiber is incorporated in each laser delivery bundle so that each optical sensor fiber senses laser light output by one of the plurality of laser delivery optical fibers. In other such yet other embodiments, each optical sensor fiber is optically shielded through to the end of the laser delivery bundle. In further embodiments, the method further comprises arranging a distal end of the plurality of optical sensor fibers in a sensor comprising an array of optical sensor fiber ends and positioning a camera that detects the distal end of the plurality of optical sensor fibers. In even further embodiments, the laser welding system is a simultaneous laser welding system. In yet further embodiments, the laser welding system is a direct delivery laser welding system.

The present technology also provides a laser welding apparatus. The laser welding apparatus includes a laser bank for outputting from a laser source laser light through a plurality of laser delivery bundles through a wave guide to a plurality of work pieces to be welded, wherein each said laser delivery bundle is comprised of at least a laser delivery optical fiber. At least an optical sensor fiber is positioned to sense a laser light output by one of the plurality of laser delivery bundles relating to the intensity output of one of the plurality of laser delivery optical fibers, wherein said at least an optical sensor fiber relays the sensed laser light output to a controller. In other embodiments, an input end of each optical sensor fiber is positioned between the delivery end of the laser delivery bundles and the plurality of work pieces to be welded. In yet other embodiments, at least an optical sensor fiber is incorporated in each laser delivery bundle for sensing laser light output by one of the plurality of laser delivery optical fibers. In other such yet other embodiments, the optical sensor fiber is optically shielded through to the end of the laser delivery bundle. In further embodiments, the distal ends of each of the plurality of optical sensor fibers form an array and a camera is positioned to detect the distal ends of each of the plurality of optical sensor fibers. In even further embodiments, the laser welding apparatus is a simultaneous laser welding apparatus. In yet further embodiments, the laser welding apparatus is a direct delivery laser welding apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is another flow chart of control logic for a control routine for determining whether a laser delivery bundle is delivering satisfactory laser light intensity.

Corresponding reference numerals indicate corresponding parts throughout the several views of the drawings.

DETAILED DESCRIPTION

Figure 1:
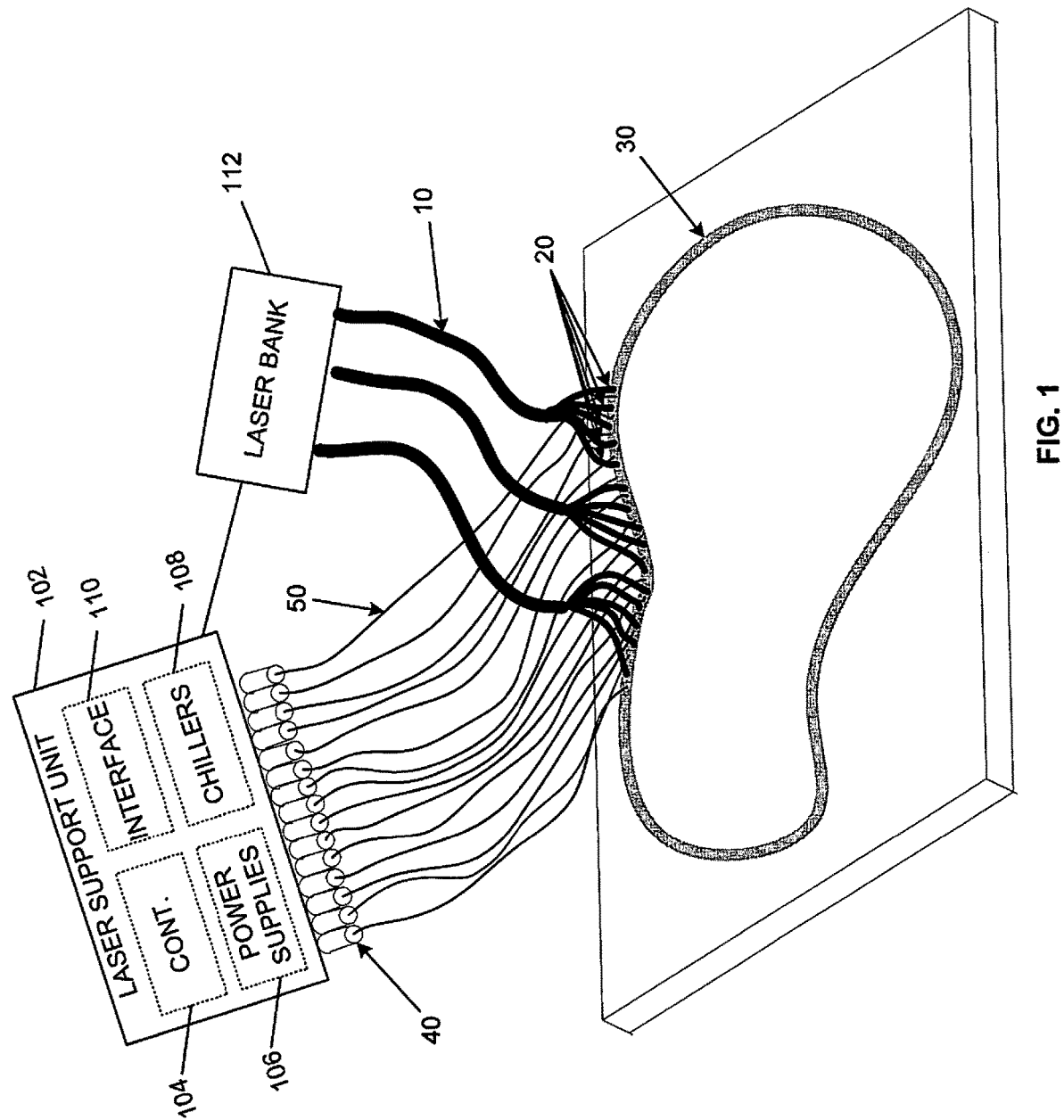
FIG. 1 is a schematic view illustrating an embodiment according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. If, for some reason, the imprecision provided by "about" is not otherwise understood in the art with this ordinary meaning, then "about" as used herein may indicate a possible variation of up to 5% of the indicated value or 5% variance from usual methods of measurement.

As used herein, the term "composition" refers broadly to a substance containing at least the preferred metal elements or compounds, but which optionally comprises additional substances or compounds, including additives and impurities. The term "material" also broadly refers to matter containing the preferred compounds or composition.

In addition, disclosure of ranges includes disclosure of all values and further divided ranges within the entire range, including endpoints and sub-ranges given for the ranges.

Figure 3:
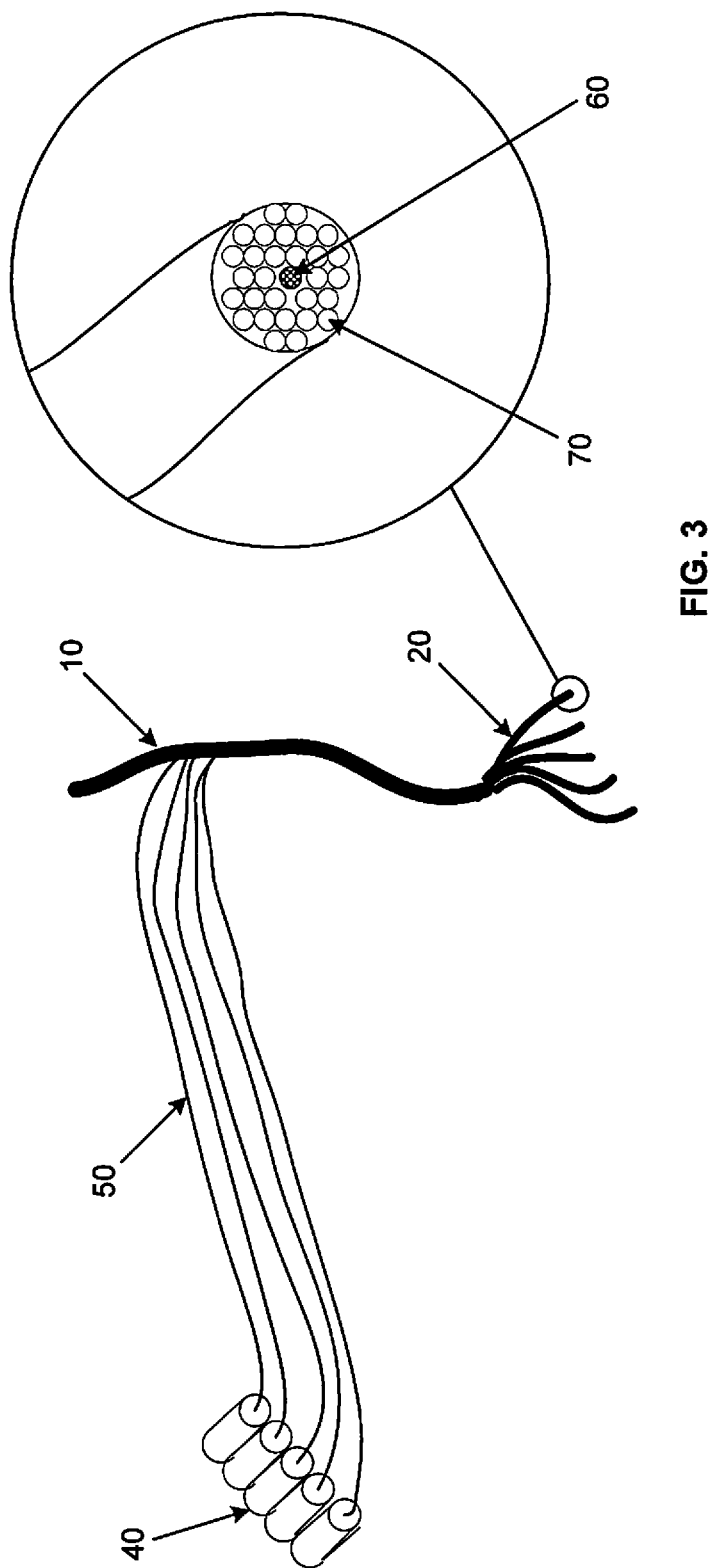
FIG. 3 is an enlarged schematic view illustrating a leg comprising a plurality of laser delivery optical fibers and an optical sensor fiber.

As illustrated in FIG. 1, the technology according to the present disclosure provides methods and apparatuses for use in simultaneous laser welding. It should be understood, however, that the scope of the disclosure extends to direct delivery laser welding applications and other applications where there is very little room for sensors between the end of fiber bundles and work pieces. Under conventional methods for simultaneous laser welding, at least a laser delivery bundle 10 receives laser light from a laser bank 112. Each laser delivery bundle 10 may be further split into legs 20, and each leg 20 is comprised of at least a laser delivery optical fiber 70 (as shown in FIG. 3). Notably, if laser delivery bundle 10 is not split into legs 20, then each laser delivery bundle 10 is comprised of at least a laser delivery optical fiber 70. Each laser delivery optical fiber 70 delivers laser light from laser bank 112 to a plurality of work pieces to be welded together. Waveguide 30 homogenizes the laser light delivered to the work pieces through each laser delivery optical fiber 70.

According to an embodiment of the present disclosure, a plurality of sensors 40 comprises a plurality of optical sensor fibers 50, where the plurality of optical sensor fibers 50 sense the laser light at the delivery ends of (i.e., the end of laser delivery optical fiber 70 where laser light is directed to a plurality of work pieces to be welded) of each laser delivery optical fiber 70. Each optical sensor fiber 50 is positioned so that an input end of optical sensor fiber 50 senses the output laser light at the delivery end of laser delivery optical fiber 70 and relays the laser light to a corresponding sensor 40, where sensor 40 provides feedback of the laser light intensity sensed by optical sensor fiber 50. More specifically, each optical sensor fiber 50 senses the laser light output of an associated laser delivery optical fiber 70 and transmits this laser light to an associated sensor 40. Further, it is contemplated that each optical sensor fiber 50 is positioned between the delivery end of the laser delivery bundles and the plurality of work pieces to be welded; each optical sensor fiber 50 may be positioned between the delivery end of each laser delivery optical fiber 70 and the plurality of work pieces to be welded. Notably, while FIG. 1 shows a matching number of sensors 40 to optical sensor fibers 50, it is also contemplated there may be fewer or more sensors 40 in relation to the number of optical sensor fibers 50. Further, in yet other embodiments, it is contemplated that there may be fewer, more, or equal numbers of optical sensor fibers 50 to the number of laser delivery optical fibers 70. In yet other embodiments, there may be equal amounts of legs 20 and optical sensor fibers 50. In yet further embodiments, there may be equal amounts of laser delivery bundles 10 and optical sensor fibers 50. What is important, however, is that each laser delivery optical fiber 70 is susceptible to having its corresponding output of laser light sensed by at least a corresponding optical sensor fiber 50.

Figure 2:
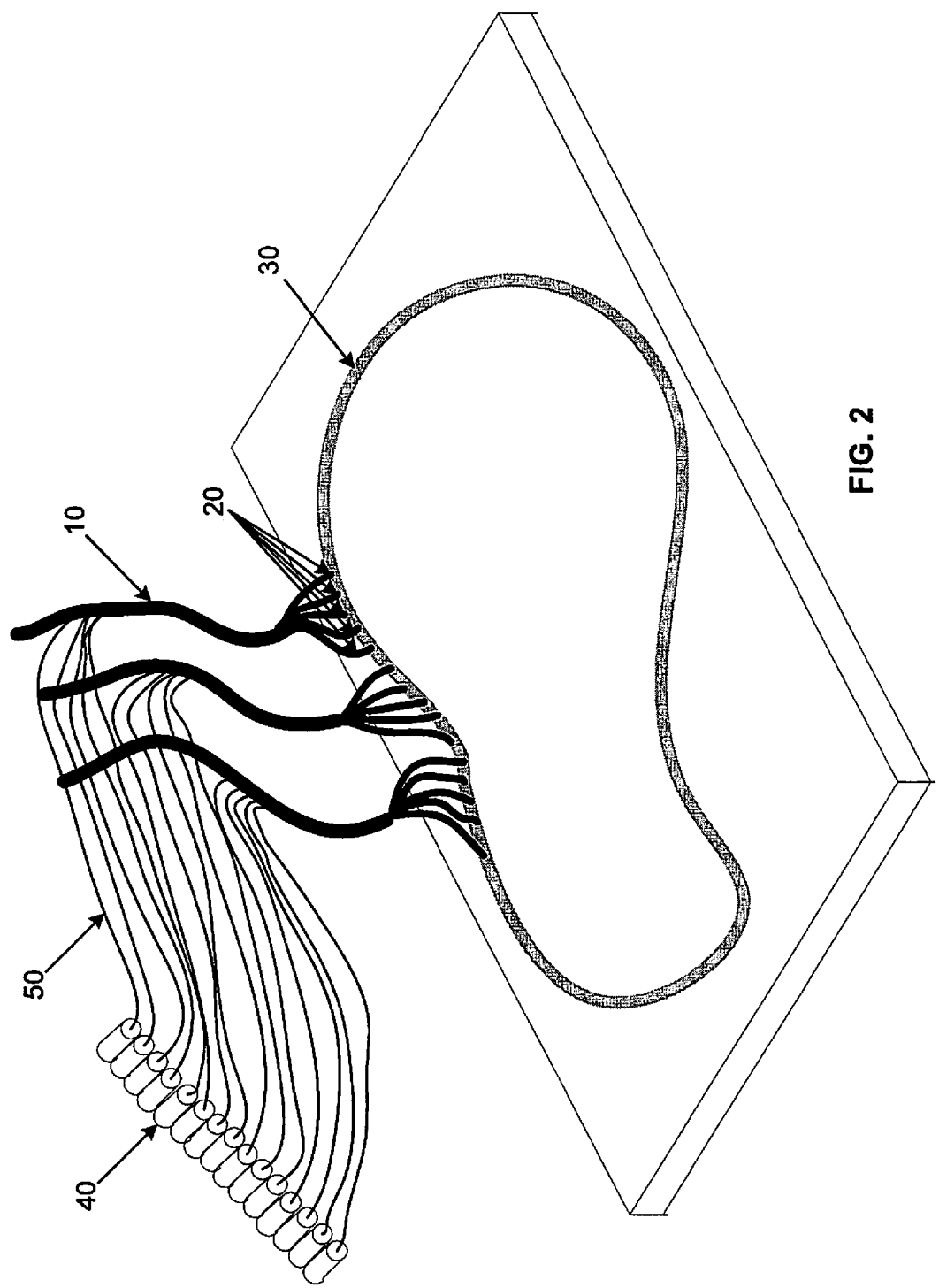
FIG. 2 is a schematic view illustrating another embodiment according to the present disclosure.

Referring to FIG. 2, an alternate embodiment is disclosed. Like in FIG. 1, this alternate embodiment includes a conventional method for simultaneous welding, wherein at least a laser delivery bundle 10 receives laser light from laser bank 112 (shown in FIG. 1). Each laser delivery bundle 10 may be further split into legs 20, and each leg 20 is comprised of at least a laser delivery optical fiber 70 (as shown in FIG. 3). Notably, if laser delivery bundle 10 is not split into legs 20, then each laser delivery bundle 10 is comprised of at least a laser delivery optical fiber 70. Under the embodiment shown in FIG. 2, a plurality of sensors 40 comprises a plurality of optical sensor fibers 50, where the plurality of optical sensor fibers 50 sense the laser light of each laser delivery optical fiber 70 at the delivery end of laser delivery optical fiber 70. Each optical sensor fiber 50 is positioned so that an input end of optical sensor fiber 50 senses the laser light at the delivery end of laser delivery optical fiber 70 and relays the laser light to a corresponding sensor 40, where sensor 40 provides feedback of the laser light intensity sensed by optical sensor fiber 50. More specifically, each optical sensor fiber 50 senses the laser light output of an associated laser delivery optical fiber 70 and transmits this laser light to an associated sensor 40. Each optical sensor fiber 50 is integrated into a corresponding laser delivery bundle 10, and each optical sensor fiber 50 may be further integrated into a leg 20. In yet other embodiments, it is contemplated that there may be a plurality of optical sensor fibers 50 per leg 20 or, if the laser delivery bundle 10 is not divided into legs, then per laser delivery bundle 10. Notably, while FIG. 2 shows a matching number of sensors 40 to optical sensor fibers 50, it is also contemplated there may be fewer or more sensors 40 in relation to the numbers of optical sensor fibers 50. Further, in yet other embodiments, it is contemplated that there may be fewer, more, or equal numbers of optical sensor fibers 50 to the number of laser delivery optical fibers 70. In yet other embodiments, there may be equal amounts of legs 20 and optical sensor fibers 50. In yet further embodiments, there may be equal amounts of laser delivery bundles 10 and optical sensor fibers 50. What is important, however, is that each laser delivery optical fiber 70 is susceptible to having its corresponding output of laser light sensed by at least a corresponding optical sensor fiber 50.

Referring to FIG. 3, the embodiment according to the aspect of FIG. 2 is further described. An enlarged schematic view of a leg 20 shows at its end a plurality of laser delivery optical fibers 70 and an optically shielded optical fiber 60. As stated above, ideally optical sensor fiber 50 senses the laser light coming from laser delivery optical fibers 70 at the delivery end of leg 20 (or laser delivery bundle 10, if there is not at least one leg 20). To achieve this goal, optical sensor fiber 50 is optically shielded along its circumference through to the delivery end of laser delivery optical fiber 70 to prevent optical sensor fiber 50 from sensing any laser light delivered through laser delivery optical fiber 70 not at the delivery end of laser delivery optical fiber 70. Optical sensor fiber 50 is therefore positioned so that an input end of optical sensor fiber 50 senses the output laser light at the delivery end of laser delivery optical fiber 70 and relays the laser light to a corresponding sensor 40, where sensor 40 provides feedback of the laser light intensity sensed by optical sensor fiber 50.

Figure 4:
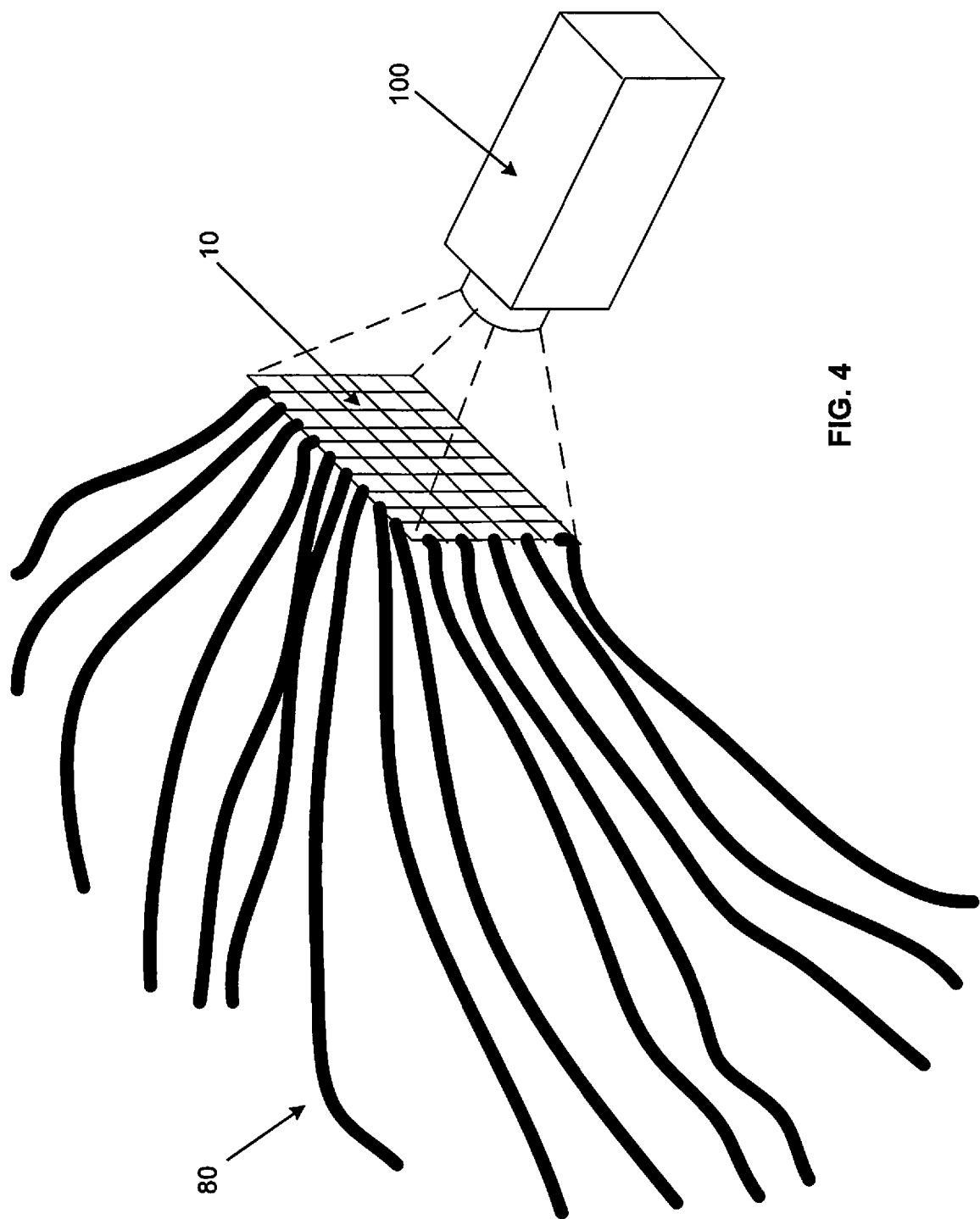
FIG. 4 is a schematic view illustrating additional variants of each of FIGS. 1-3.

Referring to FIG. 4, an alternate embodiment according to the previous aspects is disclosed. A plurality 80 of optical sensor fibers 50 is shown wherein the distal ends (i.e., at an opposite end of the input end) of the plurality 80 of optical sensor fibers 50 form an array 90. In such a setup, each optical sensor fiber 50 transmits laser light sensed by a corresponding laser delivery optical fiber 70 at the end of leg 20 (or laser delivery bundle 10, if there is not at least one leg 20). Array 90 is in optical communication with camera 100. In some embodiments, camera 100 may be viewed by an operator, thereby allowing the operator to determine whether any optical sensor fiber 50 sensed an unsatisfactory transmitted laser light intensity. In other words, an operator can determine by viewing camera 100 whether a particular leg 20, laser delivery bundle 10, or laser delivery optical fiber 70 is transmitting an unsatisfactory intensity of laser light and make necessary adjustments (e.g., changing a faulty laser delivery bundle 10 or adjusting the intensity of a faulty laser delivery bundle 10 to deliver a satisfactory laser light intensity) to compensate upon viewing unsatisfactory results. In yet other embodiments, as described more fully below, camera 100 may be part of a control routine for automatically providing an alarm if a sensor indicates unsatisfactory laser light intensity or for automatically adjusting the intensity of a laser delivery bundle 10 that fails to deliver a satisfactory intensity of laser light.

The aforementioned aspects described according to the present disclosure may be used as part of an SSTIr laser welding system. Referring again to FIG. 1, an exemplary SSTIr system includes a laser support unit 102 including one or more controllers 104, an interface 110, one or more power supplies 106, and one or more chillers 108. Laser support unit 102 is in electrical communication with sensors 40. The SSTIr laser welding system may also include an actuator, one or more laser banks 112, and an upper tool/waveguide assembly and a lower tool fixtured on a support table. Laser support unit 102 is coupled to the actuator and each laser bank 112 and provides power and cooling via power supply (or supplies) 106 and chiller (or chillers) to 108 to laser banks 112 and controls the actuator and laser banks 112 via controller 104. The actuator is coupled to the upper tool/waveguide assembly and moves it to and from the lower tool under control of controller 104.

Figure 5:
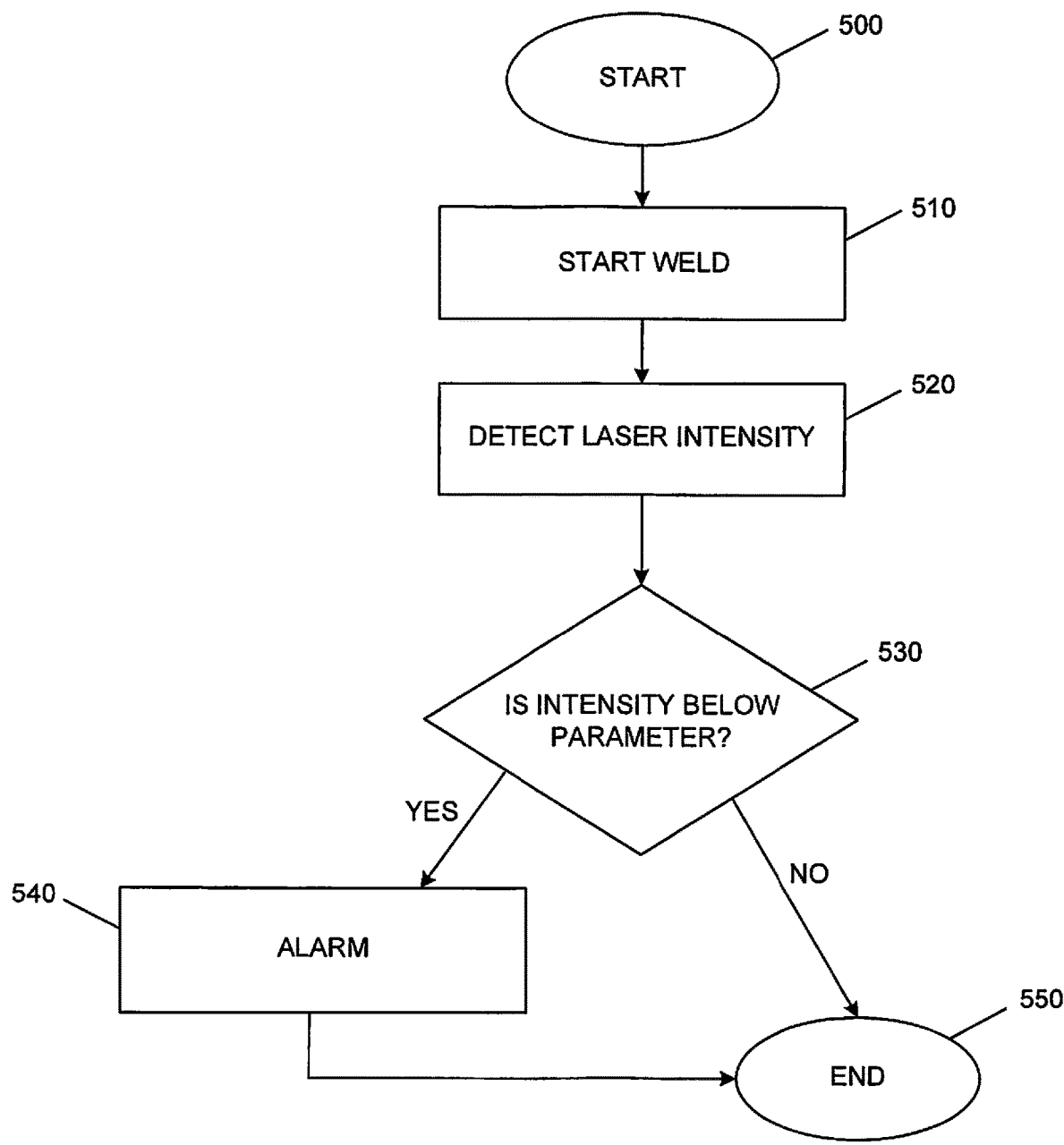
FIG. 5 is a flow chart of control logic for a control routine for determining whether a laser delivery bundle is delivering satisfactory laser light intensity.

FIG. 5 is a flow chart of control logic for an example control routine implemented in controller 104 for determining whether a laser delivery bundle is delivering satisfactory laser light intensity. The control routine starts at 500 and proceeds to 510 to begin a weld cycle. The control routine proceeds to 520, where, during the weld cycle, a sensor (e.g., sensor 40 via associated optical sensor fiber 50) detects the laser light intensity. The control routine proceeds to 530, where controller 104 determines whether the laser intensity detected by the sensor is below a predetermined parameter. If controller 104 determines the detected laser intensity is below a predetermined parameter, the control routine proceeds to 540, and controller 104 issues an alarm indicating same. After issuing the alarm or determining no alarm is required, the control routine proceeds to end 550.

In further embodiments, the fiber feedback system further includes a closed control loop, as described in U.S. Pat. No. 7,343,218, which is commonly owned by the same assignee and is incorporated herein by reference.

FIG. 6 is a flow chart of control logic for an example control routine implemented in controller 104 for determining whether a laser delivery bundle is delivering satisfactory laser light intensity. The control routine starts at 600 and proceeds to 610 to begin a weld cycle. The control routine proceeds to 620, where, during the weld cycle, a sensor (e.g., sensor 40 via associated optical sensor fiber 50) detects the laser light intensity. The control routine proceeds to 630, where controller 104 determines whether the weld is ended. If controller 104 determines that the weld is not ended, the control routine proceeds to 640, and controller 104 adjusts the intensity of the laser delivery bundle to bring the intensity within a predetermined range. After adjusting the intensity or determining no such adjustment is warranted, the control routine proceeds to end 620. If controller 104 determines that the weld is ended, the control routine proceeds to end 650.

Controller 104 can be or includes any of a digital processor (DSP), microprocessor, microcontroller, or other programmable device which are programmed with software implementing the above described logic. It should be understood that alternatively it is or includes other logic devices, such as a Field Programmable Gate Array (FPGA), a complex programmable logic device (CPLD), or application specific integrated circuit (ASIC). When it is stated that controller 104 performs a function or is configured to perform a function, it should be understood that controller 104 is configured to do so with appropriate logic (such as in software, logic devices, or a combination thereof), such as control logic shown in the flow charts of FIGS. 5 and 6. When it is stated that controller 104 has logic for a function, it should be understood that such logic can include hardware, software, or a combination thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A laser welding apparatus, the laser welding apparatus comprising:
a laser bank for outputting from a laser source laser light through a plurality of laser delivery bundles through a wave guide to a plurality of work pieces to be welded, wherein each laser delivery bundle is comprised of at least one laser delivery optical fiber having a delivery end that delivers the laser light to the plurality of work pieces through the wave guide; and
a plurality of optical sensor fibers, each optical sensor fiber being associated with one of the laser delivery bundles of the plurality of laser delivery bundles, and each optical sensor fiber being connected to an associated sensor of the optical sensor fiber and positioned such that an input end of the optical sensor fiber is positioned between the plurality of work pieces to be welded and the delivery end of the at least one laser delivery optical fiber of the associated laser delivery bundle and senses a laser light output by the at least one delivery optical fiber of the associated laser delivery bundle relating to the intensity output of the at least one laser delivery optical fiber, wherein each of the plurality of optical sensor fibers relays the sensed laser light output to the associated sensor of the optical sensor fiber located at a distal end of the optical sensor fiber and the associated sensor provides feedback of the intensity output to a controller.

2. The laser welding apparatus of claim 1, wherein each optical sensor fiber of the plurality of optical sensor fibers is optically shielded through to a delivery end of the corresponding laser delivery bundle.

3. The laser welding apparatus of claim 1, wherein the laser welding apparatus is a simultaneous laser welding apparatus.

4. The laser welding apparatus of claim 1, wherein the laser welding apparatus is a direct delivery laser welding apparatus.

* * * * *